United States Patent
Böhm et al.

(10) Patent No.: US 6,457,784 B1
(45) Date of Patent: Oct. 1, 2002

(54) METHOD AND DEVICE FOR STATICALLY OR DYNAMICALLY DETERMINING SET VALUES CONCERNING BRAKING FORCES OR BRAKING TORQUE

(75) Inventors: Jürgen Böhm, Oberniesen; Thomas Berthold, Darmstadt, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/646,027

(22) PCT Filed: Mar. 10, 1999

(86) PCT No.: PCT/EP99/01542

§ 371 (c)(1),
(2), (4) Date: Apr. 13, 2001

(87) PCT Pub. No.: WO99/46139

PCT Pub. Date: Sep. 16, 1999

(30) Foreign Application Priority Data

Mar. 12, 1998  (DE) .......................... 198 10 656

(51) Int. Cl.[7] .................................. B60T 8/60
(52) U.S. Cl. .............................. 303/155; 303/3
(58) Field of Search ............... 303/3, 112, 152, 303/155; 180/65.1–65.8, 197

(56) References Cited

U.S. PATENT DOCUMENTS

| | | | | |
|---|---|---|---|---|
| 4,962,969 A | * | 10/1990 | Davis .............................. | 303/3 |
| 5,294,191 A | * | 3/1994 | Giorgetti et al. ................ | 303/3 |
| 5,433,512 A | | 7/1995 | Aoki et al. | |
| 5,472,264 A | * | 12/1995 | Klein et al. ...................... | 303/3 |
| 5,476,310 A | * | 12/1995 | Ohtsu et al. .................... | 303/3 |
| 5,839,800 A | * | 11/1998 | Koga et al. .................. | 303/152 |
| 6,062,658 A | * | 5/2000 | Stumpe et al. ............... | 303/155 |
| 6,325,470 B1 | * | 12/2001 | Schneider .................... | 303/152 |

FOREIGN PATENT DOCUMENTS

| | | |
|---|---|---|
| DE | 14 38 812 | 2/1969 |
| DE | 38 03 908 | 8/1988 |
| DE | 39 13 059 | 10/1990 |
| DE | 41 24 496 | 1/1993 |
| DE | 42 25 080 | 2/1993 |
| DE | 44 38 017 | 5/1996 |
| DE | 196 04 134 | 8/1997 |
| DE | 196 04 391 | 8/1997 |
| DE | 196 07 823 | 8/1997 |
| EP | 0 361 708 | 4/1990 |
| EP | 0 626 287 | 11/1994 |
| EP | 0 758 591 | 2/1997 |
| EP | 0 770 511 | 5/1997 |
| GB | 2 316 191 | 2/1998 |

* cited by examiner

*Primary Examiner*—Christopher P. Schwartz
(74) *Attorney, Agent, or Firm*—Rader, Fishman & Grauer PLLC

(57) ABSTRACT

A device for determining set values for the braking forces or braking torque of the brake system of a vehicle comprising an electric drive, a friction brake applying braking forces to all wheels according to corresponding set values, an electrodynamic regenerative brake applying braking forces to at least one axle according to corresponding set values, and an element for determining the set values according to the desired vehicle deceleration, wherein such element for determining the set values according to the deceleration requirement either makes the set value for the electric regenerative as large as possible or sets the set values for the electrodynamic regenerative brake and for the friction brake primarily according to criteria concerning the distribution of the braking forces on the axles. In addition, an element for correcting a set value for the friction brake, preferably at the front axle according to the dynamic behavior of the electrodynamic regenerative brake may be provided.

32 Claims, 6 Drawing Sheets

METHOD AND DEVICE FOR STATICALLY OR DYNAMICALLY DETERMINING SET VALUES CONCERNING BRAKING FORCES OR BRAKING TORQUE

TECHNICAL FIELD

The invention concerns a method and device for statically or dynamically determining set values for braking forces or braking torques.

BACKGROUND OF THE INVENTION

The invention is designed for application in vehicles that are driven completely or at least partially by electric drives. This type of motor vehicle is shown schematically in FIG. 1. Via a transmission, an electric drive, for example an electric motor 101, can act on a vehicle axle 110b, preferably the front axle, and drive its wheels 109c, 109d. The motor receives its energy from a battery 102; however, a switch block 112 is arranged in between them, and it switches the energy supply according to a control system. The switch block 112 can exhibit comparatively simple switches, for example relays, or more complex switches, for example thyristors.

Since, in principle, electric motors can function as generators, electrodynamic regenerative brakes already have been proposed for electrically driven vehicles. In that case, the motor is no longer used as the drive, but as a generator that is driven by the momentum of the vehicle by way of the wheels and the drive train and, consequently, charges the battery 102.

For various reasons, such a brake system alone may not provide sufficient performance under all driving conditions. For example, at low speeds, the electric motor may not generate enough power to build up the required braking force as a generator. In addition, especially in connection with asynchronous transmissions, no manual transmission is used and, therefore, there is not sufficient braking force at high speeds, i.e. high r.p.m. The relationship $P = M \cdot \omega$ describes the relationship between motor power P, motor torque M and motor speed $\omega$. If power P is considered to be more or less constant, then the available drive torque and, consequently, also the available braking torque are low at high speed. Thus, an electrodynamic regenerative brake often is not powerful enough at high speeds to satisfy the actual or legal requirements. The same applies with respect to medium speed ranges when high deceleration is necessary. Despite the low speed, the electrodynamic regenerative brake sometimes may not provide adequately high braking torque. Another reason for the insufficient performance of a regenerative brake system is the limited chargeability of the battery—for example in that operating state when the battery has just been fully charged and no additional consumers of electric power are provided, and no braking torque is generated by the electric motor acting as a generator. The battery can be destroyed by overcharging.

Hence, it has been proposed to supplement the brake system of a vehicle driven additionally by electric means by a more or less conventional brake system. Thus, for example, EP-A-0 361 708 studies a combination of an electrodynamic regenerative brake and a conventional friction brake. In this case, the friction brake is used for providing the braking torque that may be missing; however, the system is designed to maximize the braking torque generated by the electrodynamic regenerative brake in order to keep the amount of recycled electric energy as high as possible. This system, however, does not take into consideration adequately the required distribution of the braking force on the front axle and rear axle of a vehicle. In particular when the driver applies the brakes strongly, the braking forces have to be distributed on the vehicle axles in such a way that optimal braking results are achieved.

Furthermore, apart from the statically obtained set value, an electrodynamic regenerative brake on the one hand and a conventional brake, e.g. an hydraulic brake, on the other hand have different dynamic response characteristics. If the cooperation of the two brakes is to be optimized, the different dynamics of the two brakes have to be adapted to each other.

The object of the present invention is to disclose a method and a device for determining set values for braking forces that lead to well adapted braking procedures.

Another object of the invention is to disclose a method and a device for determining set values for braking forces or braking torque that take into consideration the dynamic characteristics of the brake systems.

Prior to describing the invention, the terms used in this application shall be explained. When only "set values" are mentioned, this refers to set values for braking forces or braking torque. In general, therefore, high set values indicate a strong application of brakes and low set values point to a weak application of brakes. Moreover, only braking torque is referred to below; braking force is equivalent to this.

The invention relates to a vehicle comprising both an electrodynamic regenerative brake and a friction brake. Whereas the friction brake acts on all wheels of a vehicle, the electrodynamic regenerative brake acts on at least one axle of the vehicle. If, for example, an electric vehicle has front-wheel drive, the electrodynamic regenerative brake can act only on the front axle. The electrodynamic regenerative brake works according to the mechanism described above, i.e. the driving electric motor is used as a generator for charging the battery. The torque required to drive it is then supplied to it through the push of the vehicle that occurs during braking/deceleration via the drive train (wheels, axle, transmission). Consequently, the electrodynamic regenerative brake can only act on that axle, preferably the front axle 110b, that is driven by the electric drive, e.g. the electric motor 101. This may be acceptable when the brakes are applied weakly, since the braking torque generated by one axle alone will be adequate. As a matter of fact, it is desirable because a high quantity of electric energy can then be recycled, particularly in view of the fact that significantly more than 70% of all braking actions are comparably weak brake applications. Thus, as far as weak brake applications are concerned, a concept can be applied which ensures that the electrodynamic regenerative brake maximizes the braking procedure and that accordingly maximum set values according to the braking requirement are supplied to this brake.

In connection with strong brake applications, however, different conditions have to be taken into account. The braking torque must be applied to both axles since then the friction value can be used on all wheels of the vehicle for deceleration. Thus, optimal utilization of the friction value on both axles can be achieved.

For another it may be necessary to do without the criterion of maximizing the set values for the electrodynamic regenerative brake, for example when this would cause strong braking of the wheels under review. On the other hand, it may be possible that the technically possible maximum braking torque is not sufficient for the electrodynamic regenerative brake to reach the set value specified for the respective axle. Then the missing quantity has to be replaced by the friction brake or its set values.

Hence, the strategy of maximizing the brake power of the electrodynamic regenerative brake is combined with a strategy of optimizing the braking characteristics by distributing the braking forces on the different axles of the vehicle. Which of these strategies should be adopted is determined by the deceleration requirement, for example on the basis of a desired vehicle deceleration determined from the deceleration requirement. In a first range of the desired vehicle deceleration with comparably low values, the strategy of maximizing the brake power of the electrodynamic regenerative brake can be followed. This frequently means that only the electrodynamic regenerative brake is used. However, in a second range of the desired vehicle deceleration with higher deceleration values, the strategy of distributing the braking force on the axles of the vehicle is followed.

The limit between the two ranges can be variable, with such change being based on either internal or external operating conditions.

The deceleration requirement that influences which braking strategy is chosen can be the driver's braking requirement as it is indicated through the brake pedal, for example. In the same way, however, deceleration requirements generated by the control system can be processed, for example from a follow-up control or similar system.

The deceleration requirement can comprise a desired vehicle deceleration (dimension m/s$^2$, negative acceleration). For one, if the deceleration requirement is derived from the brake pedal, this value in its first approximation would correspond to the position of the brake pedal. For another, the dynamics—the time-related change—of the deceleration requirement (dimension m/s$^3$) can be studied, too. If the deceleration requirement is derived from the brake pedal, this would correspond to the actuation speed of the brake pedal in the first approximation. The dynamics of the deceleration requirement indicate whether a soft, "normal" braking operation or a sudden, "unusual" panic braking operation is to be executed. Thus, for example according to the dynamics of the deceleration requirement, the above-mentioned delimitation of ranges can be shifted in favor of the braking strategy of distributing the braking torque on the axles of the vehicle, even if the desired vehicle deceleration still has comparably low values.

The friction brake preferably is an hydraulically actuated brake that can act on all wheels of the vehicle individually. Particularly advantageous is a "brake-by-wire" system, wherein the brake pressure—and accordingly the braking torque—is built up hydraulically at the individual wheels but individually according to electric signals from a control system. With such a system a different braking torque for the friction brake can be built up in a simple manner wheel by wheel or axle by axle. The "brake-by-wire" system can also have an electromechanical construction.

Furthermore, it has become evident that the dynamics of the friction brake on the one hand and those of the electrodynamic regenerative brake on the other hand are different. In particular the electrodynamic regenerative brake frequently exhibits slower response characteristics than the friction brake. This can be attributed on the one hand to relative long transmission distances in the drive train, on the other hand—and in particular—to the control system. Since practical embodiments of the combined systems described above (combinations of friction brake and electrodynamic regenerative brake) called for a friction brake control as well as a control system for the electrodynamic regenerative brake, dead times can arise in the signal processing, and this is why the electrodynamic regenerative brake responds slower. In the same way, however, switching the motor between driving and braking operation can lead to dead times, since the time constants of motor inductance in particular do not permit quick switching. Thus, the electrodynamic regenerative brake often is slower to reach its specified set value than the friction brake.

For this reason it is proposed that at least one set value for the friction brake (generated according to static criteria) be modified according to the dynamic characteristics of the electrodynamic regenerative brake. In particular, that set value of the friction brake that is intended for the vehicle axle on which the electrodynamic regenerative brake acts can be modified. The modification or correction, for example, can be executed through a control approach or by applying a simulation.

DETAILED DESCRIPTION OF THE PREFERRED EMBODIMENTS

Before describing a first embodiment on the basis of FIG. 2, a vehicle where the invention can be applied is described with reference to FIG. 1.

Figure 1:
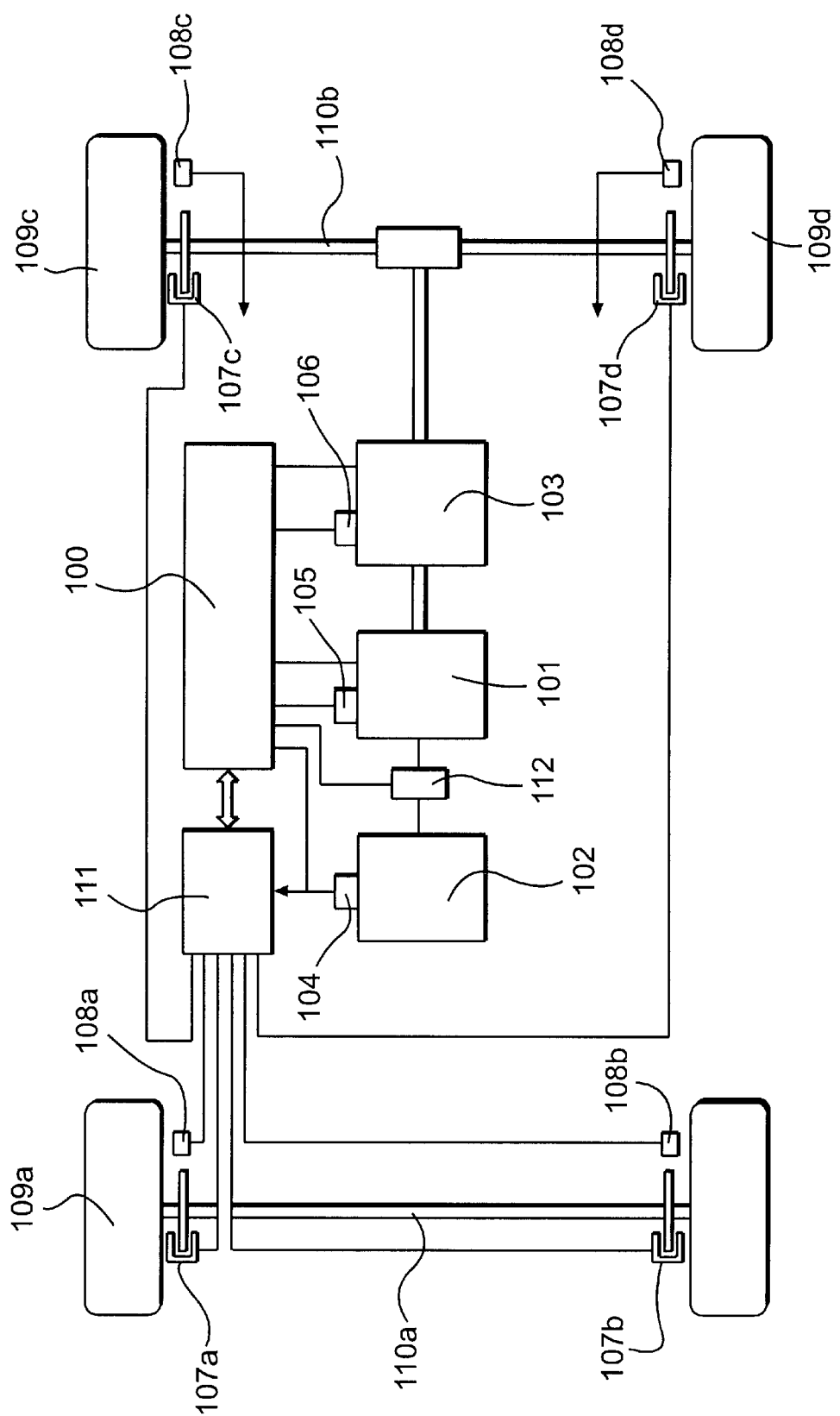
FIG. 1 is a schematic representation of the design of a vehicle where the invention can be applied.

FIG. 1 is a schematic representation of a top view of a vehicle where the front axle 110b is shown on the right and the rear axle 110a is shown on the left. Wheel sensors 108a–108d and friction brakes 107a–107d are allocated to the four wheels 109a–109d. Preferably the friction brake system is a "brake-by-wire" system, where the brake pressure and accordingly the braking torque at the individual wheels are generated according to electric signals, wherein the electric signals preferably are generated individually for each axle and even more preferably individually for each wheel by a control system 111 and supplied to the individual friction brakes 107a–107d on the individual wheels. The vehicle is driven by an electric drive 101, preferably an electric motor that receives its energy from a battery 102. A switching unit 112 is arranged between the battery 102 and the motor 101, and it controls the energy flow between the battery 102 and the motor 101 according to commands from a control system 100. The switching unit 112 can exhibit simple relays. More complex switching units 112 which control the energy flow by means of electronically switchable switches, for example thyristors, especially GTOs, are possible, too.

The propulsion power of the electric drive 101 is supplied to the vehicle via a, possibly already existing, transmission 103. In the example shown, only one axle is driven, in particular the front axle 110b. However, a drive on both sides or four-wheel drive is possible, too. Battery 102, motor 101 and possibly existing transmission 102 exhibit sensors 104, 105, 106 that report the operating states of the individual components to the control system 100.

The control system 100 has different tasks, the most important of which will be described here. It regulates the energy flow between energy accumulator/battery 102 and motor 101 in order to provide either the desired drive torque or the desired braking torque. For this purpose, control system 100 may activate the switch block 112 in an appropriate manner. Thus, control system 100 also controls the electrodynamic regenerative brake. In addition, the control system can receive signals it needs for its data processing that are not shown in FIG. 1. In particular, it can be connected to a bus in the vehicle, from which it receives the data it needs. Moreover, control system 100 can act as an interface to the control 111 of the friction brake. In this connection it must be pointed out, however, that the control system 100 for the electrodynamic regenerative brake does not have to be provided in hardware separate from that of the control system 111 for the friction brake. Nevertheless, this will frequently be the case. A joint configuration comprising both control systems 100, 111 is equally feasible.

Figure 2:
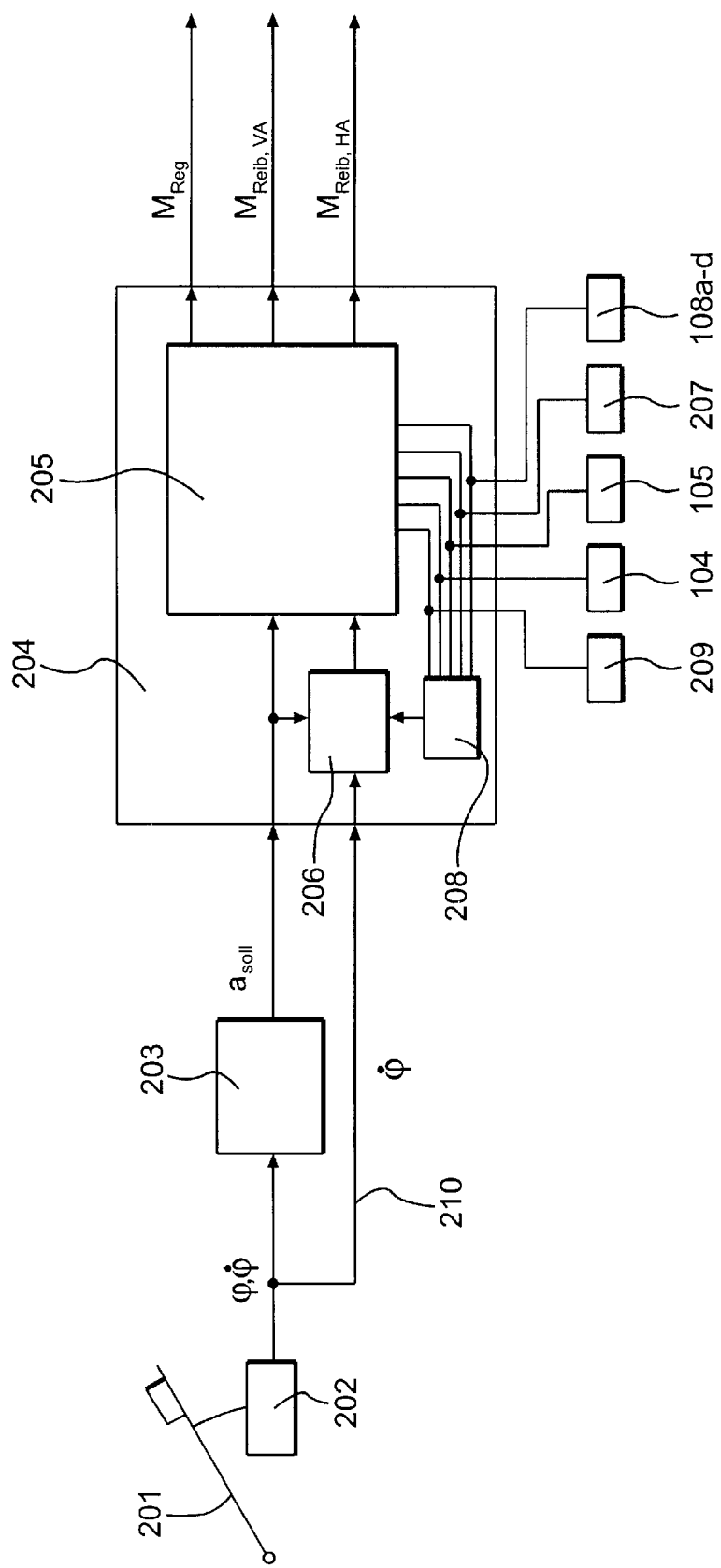
FIG. 2 shows a first embodiment according to the invention for determining set values for braking torque.

FIG. 2 shows a first embodiment for determining set values. Element 203 is an element for determining a desired vehicle deceleration $a_{set}$ from a deceleration requirement. FIG. 2 shows a configuration where a brake-pedal sensor 202 derives the deceleration requirement from the actuation of the brake pedal 201. As mentioned above, the deceleration requirement also can be generated by other control or regulating components in the vehicle. As mentioned above, too, the deceleration requirement can comprise a desired vehicle deceleration on the one hand as well as a value indicating the dynamics of the deceleration requirement on the other hand. The desired vehicle deceleration $a_{set}$ is determined in element 203 depending on the deceleration requirement, and it is used for determining the set values for braking torque (which experts consider to be the same as the braking forces).

In a preferred embodiment at least three different set values (for braking torque) are generated, i.e. a set value $M_{Reg}$ for the electrodynamic regenerative brake, a set value $M_{Reib,VA}$ for the friction brake at the front axle of the vehicle and a set value $M_{Reib,HA}$ for the rear axle of the vehicle. Instead of generating set values for each axle, set values also can be generated for each wheel. In that case, counting the set value $M_{Reg}$ five set values would have to be generated. The set values are generated in element 204, 205. Element 204 receives the desired vehicle deceleration as well as various other signals. For example, the signals of sensors 104-106 in FIG. 1, the signals of other sensors 207 that are not specified in more detail, the signals of wheel sensors 108a–108d in FIG. 1 as well as signals from an interface 209 to a data bus in the vehicle can be received. In addition, element 204 can receive a signal concerning the dynamics of the deceleration requirement. This is indicated by line 210.

Element 204, 205 determines the above-mentioned set values on the basis of variable criteria or strategies according to the deceleration requirement. Which criterion or which strategy is applied depends on the deceleration requirement (desired deceleration, dynamics) and, in particular, on the desired vehicle deceleration. For this purpose a differentiation device 206 may be provided, wherein such device outputs a signal that indicates to the actual determining element 205 which criterion or which strategy is to be applied.

One strategy is to obtain the desired vehicle deceleration merely by actuating the electrodynamic regenerative brake. This can occur when the desired vehicle deceleration or corresponding deceleration requirement is comparably low. In this case, a set value (for the braking torque) corresponding to the desired vehicle deceleration is generated only for the electrodynamic regenerative brake (i.e. $M_{Reg}$), whereas no set values or set values equal to zero are generated for the friction brake ($M_{Reib,VA}$, $M_{Reib,HA}$). Another strategy is to distribute the braking forces on the front and rear axles according to additional criteria which will be described later in connection with FIG. 4. Then a set value $M_{Reg}$ for the electrodynamic regenerative brake as well as set values $M_{Reib,VA}$, $M_{Reib,HA}$ for the friction brake are generated according to additional criteria. This strategy is suitable for higher desired vehicle deceleration or corresponding deceleration requirements.

If on the one hand set values for the electrodynamic regenerative brake and on the other hand for the friction brake are generated, it would be possible to first generate set values for the individual axles irrespective of the friction brake and electrodynamic regenerative brake and then to divide the set values between the electrodynamic regenerative brake and friction brake at that axle on which both brakes act. If necessary, this division may follow a maximization strategy for the braking torque of the electrodynamic regenerative brake.

Figure 4:
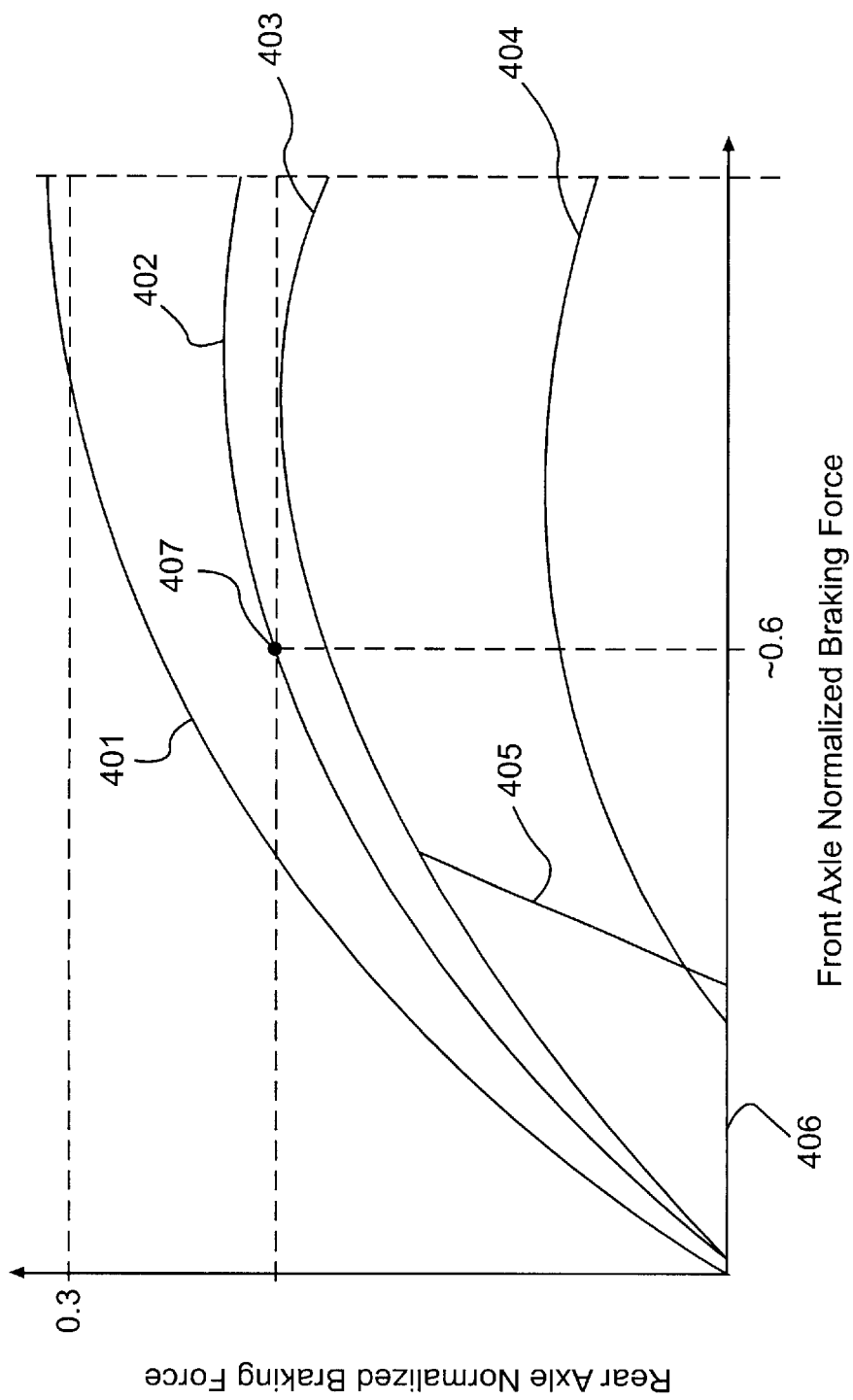
FIG. 4 is a diagram describing the brake-force distribution.

Considerations regarding the distribution of braking forces on the different axles of the vehicle are explained on the basis of FIG. 4, which shows a normalized braking force at the front axle as the abscissa and a normalized braking force at the rear axle as the ordinate. Curve 402 reflects an optimized distribution of utilization of the friction values between tires and road surface. For example, at point 407 the normalized braking force at the front axle has a value of about 0.6 and at the rear axle a value of 0.2. The distribution shown by the curve results on the basis of the criterion that the same friction value utilization be obtained between the wheels on the front axle and the wheels on the rear axle.

Line 403 of FIG. 4 shows a curve where the distribution of the braking torque on the rear axle and front axle is modified in such a way that the values on the rear axle are reduced in comparison to the optimal distribution. Thus it is ensured that the rear axle (presupposing identical friction values at all wheels) does not block before but only after the front axle. Hence almost optimal braking characteristics with respect to the vehicle deceleration and significantly improved braking characteristics with respect to the driving stability are achieved. The drop in curve 403 as compared to curve 402 can occur in such a way, for example, that the values for the rear axles are reduced by a certain percentage, for example by 20% or less, 10% or less, or 5% or less.

Curve 401 shows a modified distribution that may be chosen for a loaded vehicle, for example (when the rear axle bears a heavier load).

If the vehicle in FIG. 1 were decelerated only by the electrodynamic regenerative brake, a distribution of braking forces according to line 406 in FIG. 4 would occur when the electric drive acts on the front axle. The braking torque at the front axle would then have a certain value, whereas it is zero at the rear axle. An altogether favorable characteristic braking curve, which can be set by the system shown in FIG. 1 on the basis of set values that are to be generated, would follow along lines 406 for weak brake applications, 405 for medium brake applications and 403 for strong brake applications. Lines 406 in the left part of FIG. 4 and 403 in the right part of FIG. 4 correspond to the above-mentioned ranges of the desired vehicle deceleration. In addition, a range 405 lying between these two ranges is provided; in this range 405 the system changes from one braking strategy to another braking strategy, for example through interpolation, average formation or similar processes.

If, for example according to FIG. 4, set values for the braking torque for the individual axles of the vehicle are determined, the set values $M_{Reg}$, $M_{Reib,VA}$, $M_{Reib,HA}$ can be generated in element 205 according to the former set values. Thus, for example, a characteristics field according to FIG. 4 is implemented in element 205 by means of tables, equations or similar things.

Driving or operating states can occur where it would be suitable not to firmly follow the above-mentioned range-by-range distribution of braking strategies (for example, according to a fixed threshold value), but to adapt decisions to certain operating conditions. Some examples of such operating conditions are described below:

- The desired vehicle deceleration itself is (still) low but is increasing rapidly, the desired vehicle deceleration has high dynamics, and this can indicate a sudden brake application. In this case it would be desirable for the brake to be actuated immediately with optimal deceleration and not only when the desired vehicle deceleration has reached a certain value. Thus, it may be desirable to switch between the different braking strategies at an earlier point of time, depending on the deceleration requirement and in particular its dynamics. This, for example, can be implemented by changing and in particular reducing the threshold value in the differentiating element 206 according to the dynamics of the deceleration requirement whenever high dynamics are detected in the deceleration requirement. Thus, the vehicle is braked earlier with optimal deceleration, and no valuable time is lost before braking the vehicle.

- Despite a weak braking operation with only the electrodynamic regenerative brake, high slip or blocking wheels may occur, for example on icy roads. Even then—despite the comparably low deceleration—it may be desirable to actuate the brakes on all axles (adding the friction brake). This can be implemented, for example, when the differentiating element 206 uses slip information (determined, for example, on the basis of the signals from wheel sensors 108a–108d) to change a threshold value applied for differentiating between the braking strategies.

- The effectiveness of the electrodynamic regenerative brake depends on whether the energy generated in the motor when it is operated inversely can be output, i.e. can be taken up by the battery. If, however, the battery is fully charged the energy cannot be output, so that the electrodynamic regenerative brake remains less effective. Thus, also depending on the charge of the battery, it may be desirable to stop the application of the electrodynamic regenerative brake and to use the friction brake instead. This in turn can be implemented by appropriately modifying the differentiating criteria (according to the charge state of the battery) for the different braking criteria or strategies.

- In accordance with the above-mentioned relationship between torque M, speed ω and power P (P=M·ω), the electrodynamic regenerative brake is comparably weak at high speeds. Thus, it may be desirable to give preference to the friction brake over the electrodynamic regenerative brake also at high motor speeds, which can be implemented by means of an appropriate switchover or change in the threshold value in the differentiating element 206.

- Finally, it may be desirable to use the friction brake instead of the electrodynamic regenerative brake at low speeds too (vehicle speed close to zero), since for technical reasons the electrodynamic regenerative brake has only a weak effect at low vehicle speeds. Then, too, it may be desirable to add or to exclusively use the friction brake, so that the braking strategy with optimal deceleration is applied because the decision criteria in the differentiating element 206 are changed appropriately.

Thus one aspect of the invention is to switch between a braking strategy optimized with respect to the regeneration of electric energy and a braking strategy optimized with respect to the deceleration effect depending on the operating conditions. The braking strategy optimized with respect to the deceleration effect can mean that only the friction brake is used or it may involve an optimized application of the electrodynamic regenerative brake to the extent this is possible as regards an optimized deceleration effect. The individual strategies are applied according to the differentiating element 206, wherein the differentiating element 206 itself can be modified according to the operating conditions that need to be taken into consideration. For example, a threshold value used for differentiating purposes can be changed in the differentiating element 206 according to the operating conditions that need to be taken into consideration. This, for example, can occur through changing device 208.

Just as different operating conditions in the vehicle, for example speed of the electric drive 101, charge state of the battery 102, or slip of the wheels, can be used for shifting the delimitation between the different braking strategies (optimized with respect to regeneration, optimized with respect to deceleration), they can be used within one braking strategy to influence the determination of the set value for the electrodynamic regenerative brake. If, for example, a set value for the electrodynamic regenerative brake is to be determined within the braking strategy optimized with respect to deceleration, this value can be kept small if the charge state of the battery is very good, the motor speed very high, or the slip of certain wheels comparably high.

Figure 3:
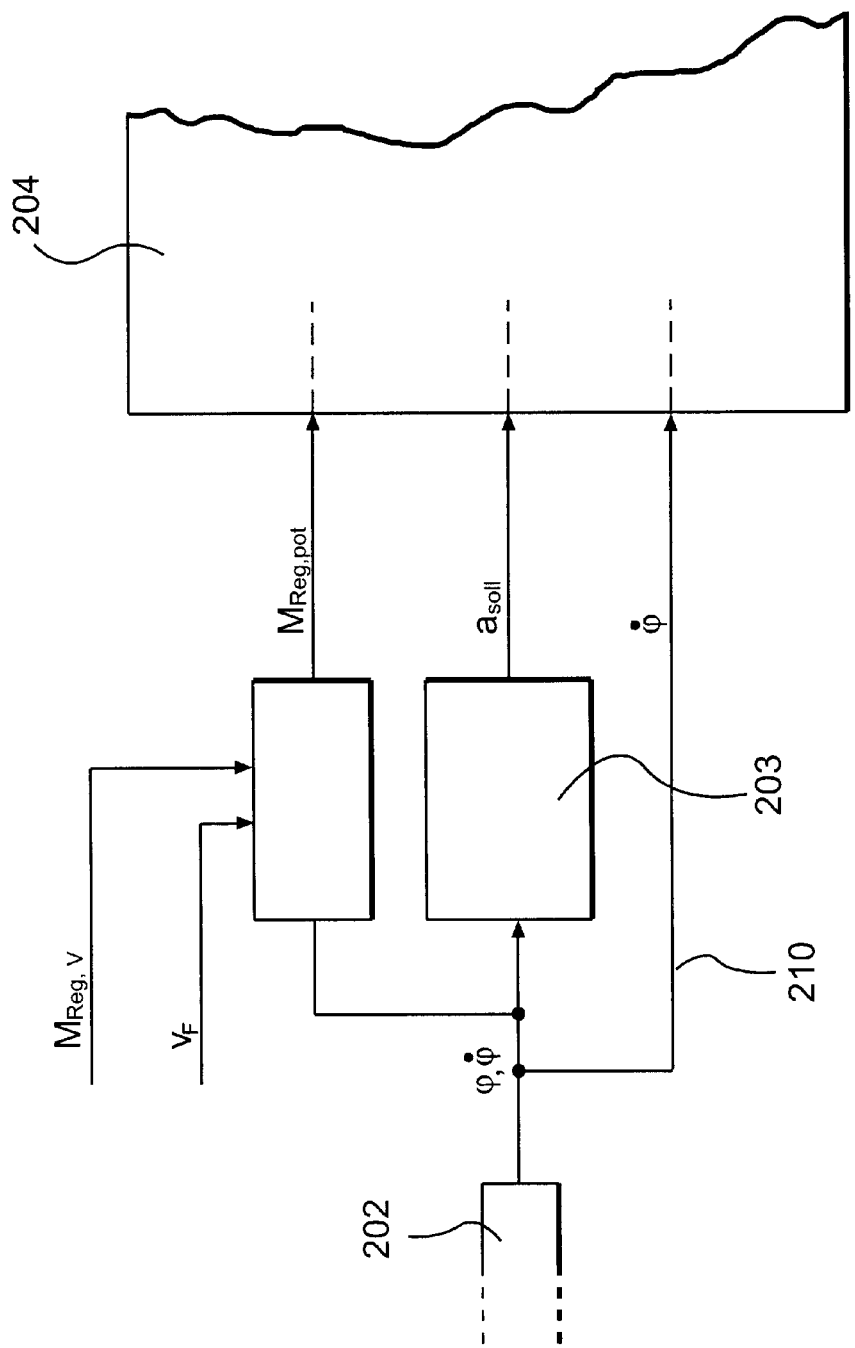
FIG. 3 shows a variant of the embodiment shown in FIG. 2.

With reference to FIG. 3 a variant of the embodiment shown in FIG. 2 is explained. Basically it is a supplement of the embodiment in FIG. 2. In the embodiment shown in FIG. 3, the calculation of the set value for the electrodynamic regenerative brake $M_{Reg}$ is divided into different steps. At first the available torque value $M_{Reg,V}$ of the electrodynamic regenerative brake is determined. The potential braking torque of the electrodynamic regenerative brake $M_{Reg,pot}$, on the basis of which the above-mentioned set values are determined together with other values, is derived from this as well as from the vehicle speed $V_F$ and the deceleration requirement.

The embodiments described above on the basis of FIGS. 2, 3, and 4 can be considered static set-value determination because, although they do take into account the different operating conditions inside and outside the vehicle when determining the set values, they do not take into consideration the dynamics of the brakes to be actuated with the set values that were determined. Since, however, it has turned out that the electrodynamic regenerative brake in particular reacts slower to the specified set values than the friction brake, an additional improvement can be achieved when determined set values, which were determined in the manner described above, are modified to take into consideration the dynamics characteristics of the brakes to be actuated. Preferably—when there is a brake that "reacts quickly" and a brake that "reacts slowly"—the set value of the brake that reacts quickly is modified in such a way that it assumes the temporary difference between set value and actual value of the brake that reacts slowly. In the system described a set value for the friction brake would have to be corrected according to the dynamic behavior of the electrodynamic regenerative brake.

Figure 5A:
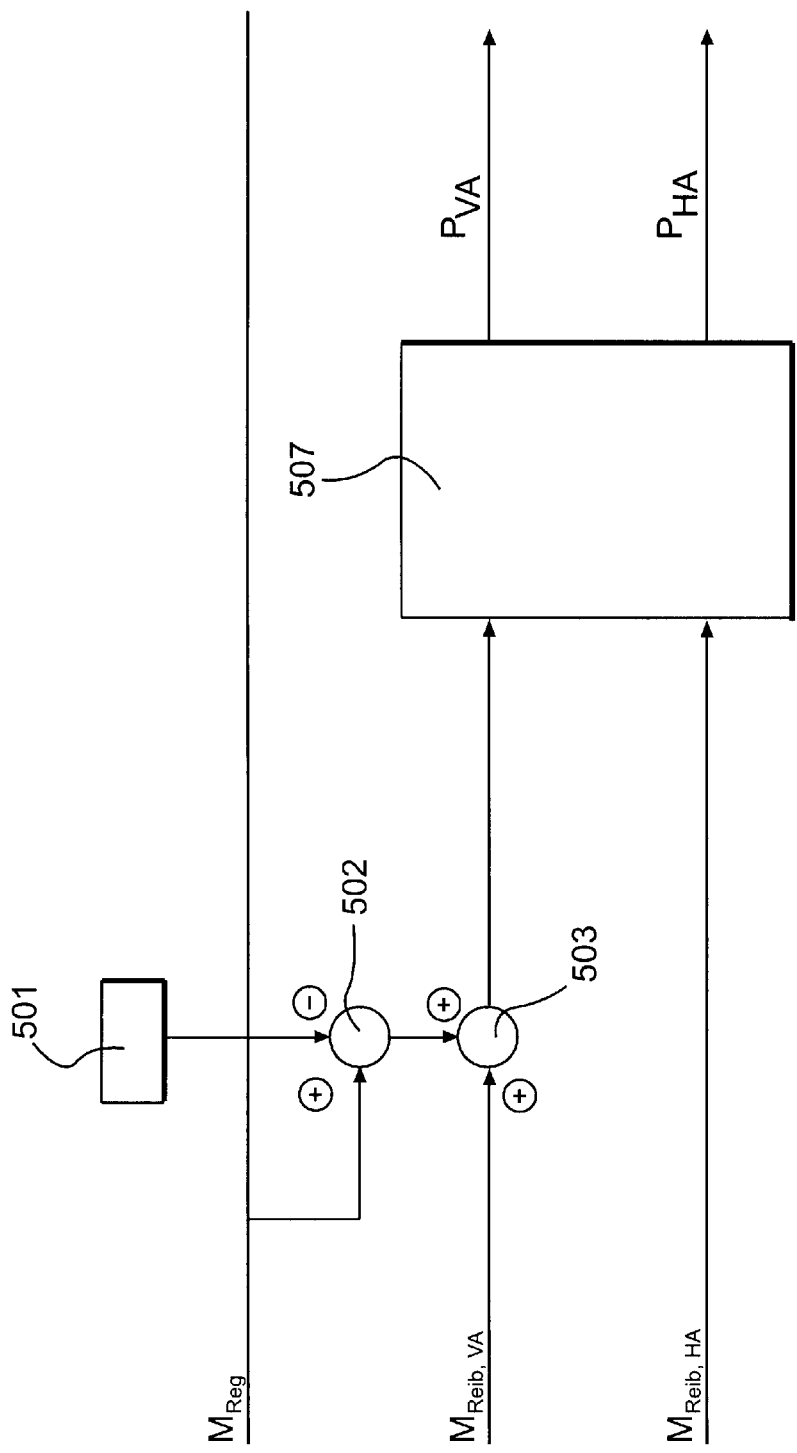
FIG. 5 illustrates a dynamic set-value determination.

FIG. 5A is a schematic representation of a first embodiment, with which this can be achieved. The embodiment receives a set value $M_{Reg}$ for the electrodynamic regenerative brake as well as at least two set values. $M_{Reib,VA}$, $M_{Reib,HA}$ for the front and rear axles of the friction brake. In addition, a device 501 is provided, which can determine the actual current braking torque of the electrodynamic regenerative brake. It can be a sensor or complex data processing that determines the above-mentioned torque on the basis of other values. In device 502 the difference between the set value and actual value is formed. The difference is added to an appropriate set value for the friction brake. Preferably it is added to the set value for the axle on which the electrodynamic regenerative brake acts. This addition is implemented in the adder 503. The wheel-brake pressure values for the individual wheel brakes are determined in device 507; these are then activated appropriately. Consequently, FIG. 5A shows a control-engineering approach to the extent that the difference between the set value and actual value is determined with respect to the electrodynamic regenerative brake and this difference is used for correcting another set value.

Figure 5B:
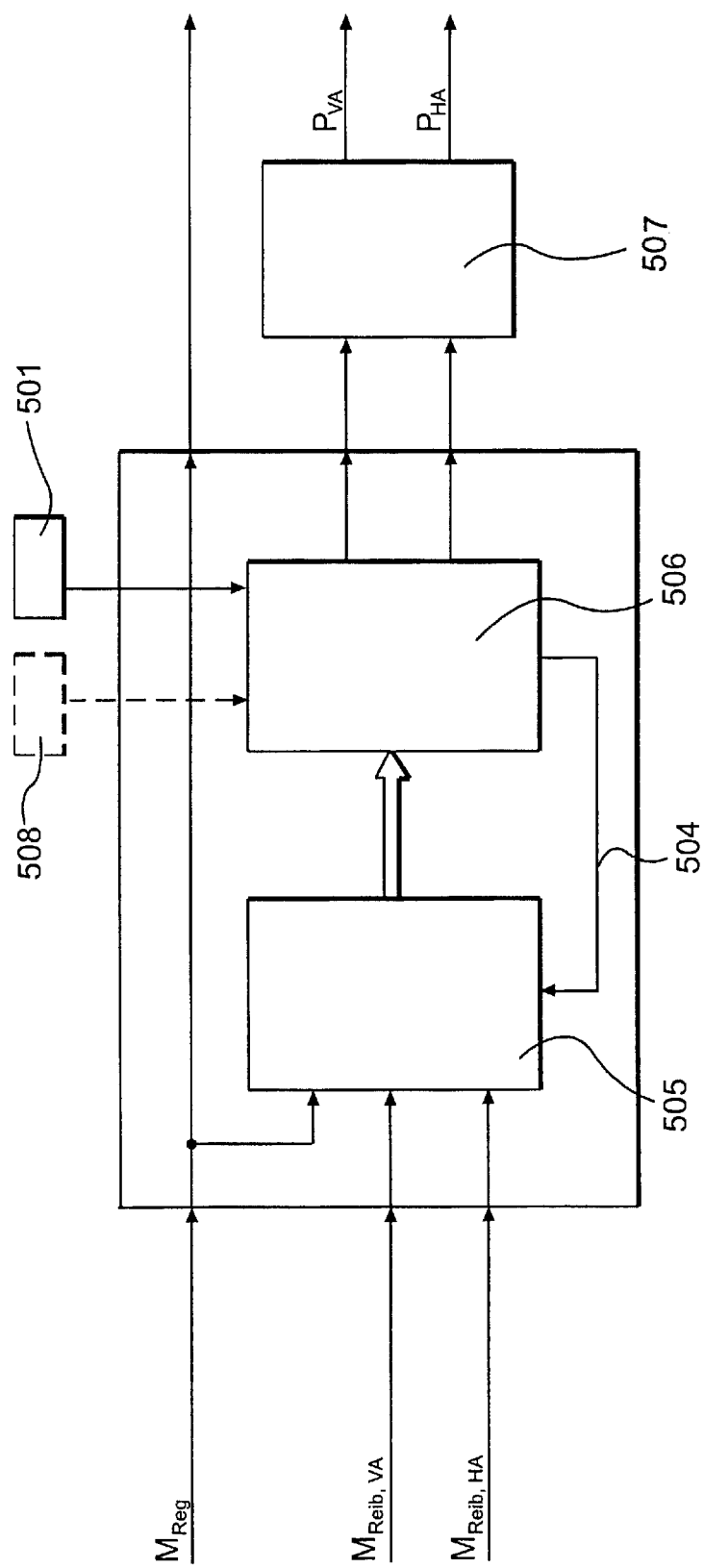

FIG. 5B shows another approach. Here, too, the above-mentioned set values are received at first. They may be determined as described with reference to FIGS. 2, 3 and 4. In the embodiment of FIG. 5B, however, the dynamic behavior of the slower brake, i.e. the electrodynamic regenerative brake in the embodiment described, is simulated and the set values for the quicker brake, i.e. the friction brake, are modified according to the simulation. The simulation, for example, can consist of leading the set value for the electrodynamic regenerative brake $M_{Reg}$ through an appropriate $DT_1$ element and the output of this element is added to a set value for the friction brake. FIG. 5B shows an embodiment in which generally the simulation and the influencing of the set values for the friction brake occur in device 504, with the set values being used then, as in FIG. 5A, for calculating the wheel-brake pressure values in device 507. There is a device 505 within device 504, which simulates the braking dynamics of the electrodynamic regenerative brake—and also of the friction brake in more sophisticated systems—on the basis of certain parameters. The dynamics set values for the friction brake are determined in device 506. In addition, trimming parameters are determined, which are used for adjusting the brake model in device 505. For this purpose, device 506 also receives signals that reflect at least the actual dynamic behavior of the electrodynamic regenerative brake. If the dynamics of the friction brake need to be taken into account also, devices 308 have to be provided, which determined the actual dynamics behavior of the friction brake and supply the information to device 506.

The embodiments described with reference to FIGS. 2, 3, 5A and 5B can be distributed among the control systems 100, 111 shown in FIG. 1. They can also, however, be implemented in one single device, on a single printed circuit board, or through one single chip that is programmed appropriately.

What is claimed is:

1. A method for determining set values for braking an electrically powered vehicle, wherein the braking forces or braking torque can be generated by a friction brake acting on all wheels of a vehicle and by an electrodynamic regenerative brake acting on at least one axle according to corresponding set values and comprising the steps of:

A) determining a desired vehicle deceleration from a determined deceleration requirement,
B) determining the set values according to the desired vehicle deceleration;
   wherein either the set value for the electrodynamic regenerative brake is defined as large as possible according to the deceleration requirement or the set values for the electrodynamic regenerative brake and for the friction brake are set primarily according to criteria concerning the distribution of braking forces on the axles,
   wherein the desired vehicle deceleration is determined according to the degree of actuation of the brake pedal as well as according to the dynamics of the brake pedal actuation wherein the delimitation between the first and second range of the desired vehicle deceleration is altered according to the dynamics of the deceleration requirement.

2. A method according to claim 1, wherein the set value for the electrodynamic regenerative brake is defined as large as possible in a first range of the desired vehicle deceleration, and the set values for the electrodynamic regenerative brake and for the friction brake are set primarily according to criteria concerning the distribution of braking forces on the axles in a second range of the desired vehicle deceleration, with such second range lying above the first range.

3. A method according to claim 2, wherein the set values for the electrodynamic regenerative brake and for the friction brake are specified in the second range in such a way that the distribution of the braking forces or braking torque on the different vehicle axles results in a distribution of the desired forces/torque on the front and rear axles that is favorable as regards the friction value utilization between tires and road surface.

4. A method according to claim 3, wherein the desired distribution is a function of the load of the vehicle.

5. A method according to claim 3, wherein the desired distribution is selected in such a way that the front axle has to block before the rear axle will block.

6. A method according to claim 2, wherein the delimitation between the first and second range of the desired vehicle deceleration is altered according to the dynamics of the deceleration requirement.

7. A method according to claim 2, wherein the delimitation between the first and second range of the desired vehicle deceleration is altered according to the slip information of at least one wheel.

8. A method according to claim 2, wherein the delimitation between the first and second range of the desired vehicle deceleration is altered according to an operating state, including at least one of the speed of the electric drive motor or according to the charge state of the battery.

9. A method according to claim 2, wherein the delimitation between the first and second range of the desired vehicle deceleration is defined according to an adjustable threshold value.

10. A method according to claim 1, wherein the set value for the electrodynamic regenerative brake is defined according to an operating state, in particular the speed, of the electric drive motor and/or according to the charge state of the battery.

11. A method according to claim 1, wherein the friction brakes of the individual wheels are controlled individually in accordance with electric signals generated according to set values.

12. A method according to claim 1, wherein the set values are modified according to slip information at the individual wheels.

13. A method according to claim 1, wherein the electrodynamic regenerative brake acts on the front axle.

14. A method for dynamically determining set values for the braking forces or braking torque of the brake system of a vehicle which can be driven electrically, wherein the braking forces or braking torque are generated by a friction brake acting on all wheels of a vehicle and an electrodynamic regenerative brake acting on at least one axle according to corresponding set values, comprising the steps of:

determining a desired vehicle deceleration, determining one or more set values according to the desired vehicle deceleration, and correcting one or more set values for the friction brake, according to the dynamic behavior of the electrodynamic regenerative brake wherein the dynamic behavior of the electrodynamic regenerative brake is simulated continuously and the set value of the friction brake is corrected according to the results of such simulation.

15. A method according to claim 14, further including the step of:

continuously determining the dynamic behavior of the electrodynamic regenerative brake and correcting the set value for the friction brake according to the results of such determination.

16. A method according to claim 14, wherein the simulation is based on characteristics fields or equations.

17. A device for determining set values for the braking forces or braking torque of the brake system of a vehicle of the type including an electric drive, a friction brake applying braking forces to all wheels of a vehicle according to appropriate set values, and an electrodynamic regenerative brake applying braking forces on at least one axle according to appropriate set values, comprising:

a device for determining a desired vehicle deceleration from a determined deceleration requirement, and a device for determining the set values according to the desired vehicle deceleration, wherein the element for determining the set values according to the deceleration requirement either makes the set value for the electrodynamic regenerative brake as large as possible, or sets the set values for the electrodynamic regenerative brake and for the friction brake according to criteria concerning the distribution of the braking forces on the axles further including a brake-pedal sensor, wherein the desired vehicle deceleration is determined according to the degree of actuation of the brake pedal as well as according to the dynamics of the pedal actuation.

18. A device according to claim 17, further including a differentiating element which differentiates between a first range of the desired vehicle deceleration and a second range of the desired vehicle deceleration, which lies above the first range, wherein the element for determining the set values makes the set value for the electrodynamic regenerative brake as large as possible in the first range and sets the set values for the electrodynamic regenerative brake and for the friction brake in the second range primarily according to the criteria concerning the distribution of the braking forces.

19. A device according to claim 18, wherein the element for determining the set values in the second range specifies the set values for the electrodynamic regenerative brake and for the friction brake in such a way that the distribution of the braking forces or braking torque on the different vehicle axles results in a distribution of the desired forces/torque on the front and rear axles that is favorable as regards the friction value utilization between tires and road surface.

20. A device according to claim 19, wherein the desired distribution is a function of the load of the vehicle.

21. A device according to claim 19, wherein the desired distribution is selected in such a way that the front axle has to block before the rear axle will block.

22. A device according to claim 18, further including a changing element that changes the delimitation between the first and second range of the desired vehicle deceleration according to the dynamics of the deceleration requirement.

23. A device according to claim 18, further including a changing element that changes the delimitation between the first and second range of the desired vehicle deceleration according to the slip information of at least one wheel.

24. A device according to claim 18, further including a changing element that changes the delimitation between the first and second range of the desired vehicle deceleration according to an operating state, in particular the speed, of the electric drive motor or according to the charge state of the battery.

25. A device according to claim 18, further including changing element that changes a threshold value in the differentiating element.

26. A device according to claim 17, further including a sensing element for sensing operating states, including the speed of the electric drive motor or the charge state of the battery, and wherein the element for determining the set values specifies the set value for the electrodynamic regenerative brake according to a sensed value.

27. A device according to claim 17, further including a control system that generates individual electric signals according to the set values for the friction brakes of the individual wheels.

28. A device according to claim 17, wherein the element for determining the set values modifies the set values according to slip information at the individual wheels.

29. A device according to claim 17, wherein the electrodynamic regenerative brake acts on the front axle.

30. A device for dynamically determining set values for the braking forces or braking torque of the brake system of a vehicle of the type including an electric drive, a friction brake applying braking forces to all wheels of a vehicle according to corresponding set values, and an electrodynamic regenerative brake applying braking forces to at least one axle according to corresponding set values, comprising:

an element for determining a desired vehicle deceleration, an element for determining the set values according to the desired vehicle deceleration, an element for correcting a set value for the friction brake at the front axle, according to the dynamic behavior of the electrodynamic regenerative brake further including an element for continuously simulating the dynamic behavior of the electrodynamic regenerative brake, wherein the correction element corrects the set value for the friction brake according to an output of the simulation element.

31. A device according to claim 30, further including an element for continuously monitoring the behavior of the electrodynamic regenerative brake, wherein the correction element corrects the set value for the friction brake according to an output of the determining element.

32. A device according to claim 30, wherein the simulation element exhibits a characteristic field or an element for calculating equations.

* * * * *